United States Patent

Cahill et al.

[15] 3,688,370
[45] Sept. 5, 1972

[54] TENDENCY IDLER ROLL AND IDLER ROLL

[72] Inventors: George N. Cahill; Frederick D. Stringer; Gary R. Whitcher, all of Pottsville, Pa.

[73] Assignee: Allied Chemical Corporation, New York, N.Y.

[22] Filed: Dec. 22, 1970

[21] Appl. No.: 100,747

[52] U.S. Cl. .............................................29/116 R
[51] Int. Cl. .............................................B21b 13/02
[58] Field of Search......29/116 R, 110; 308/178, 189

[56] References Cited

UNITED STATES PATENTS

| 503,019 | 8/1893 | Walscheid................29/116 R |
| 1,773,427 | 8/1930 | Larsh.........................308/178 |
| 2,218,206 | 10/1940 | Ackerly................29/116 R X |
| 2,621,982 | 12/1952 | Crosland..............29/116 R X |
| 2,701,430 | 2/1955 | Lorig....................29/116 R X |

FOREIGN PATENTS OR APPLICATIONS

| 775,410 | 1/1968 | Canada....................29/116 R |
| 409,720 | 2/1910 | France....................29/116 R |
| 1,206,844 | 9/1920 | Great Britain...............29/110 |

Primary Examiner—Alfred R. Guest
Attorney—Jonathan Plaut

[57] ABSTRACT

The tendency idler rolls and idler rolls used to convey and support extruded plastic films during the curing thereof, are improved to provide increased rolling capability with reduced internal friction in the ball bearings.

4 Claims, 3 Drawing Figures

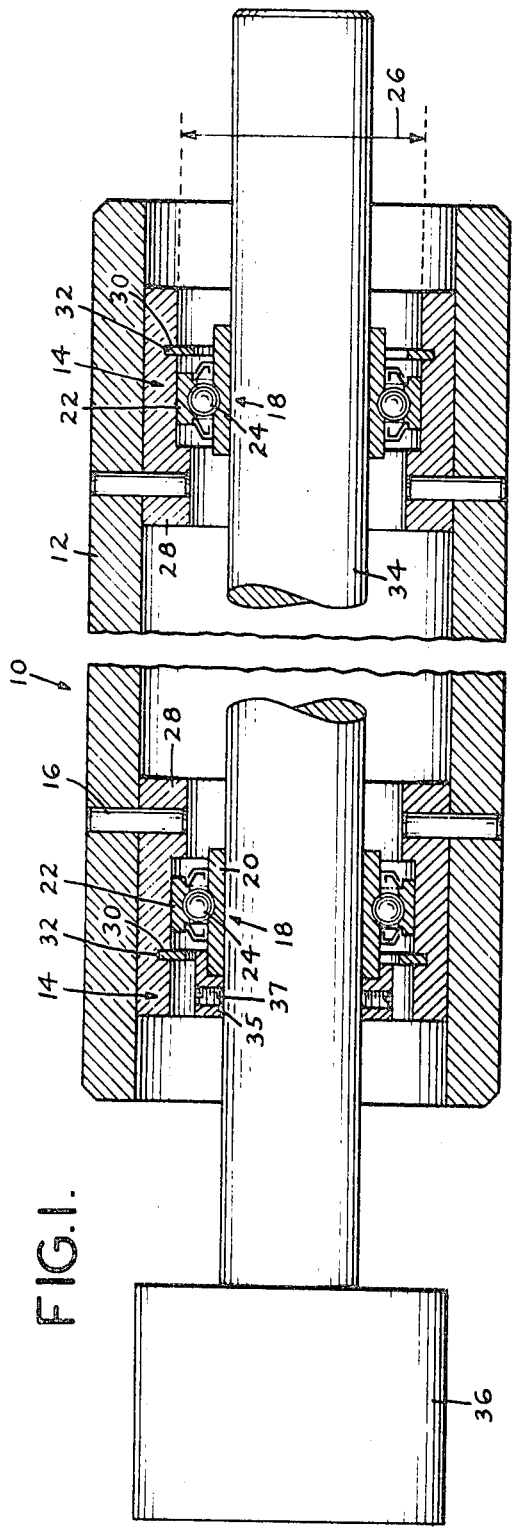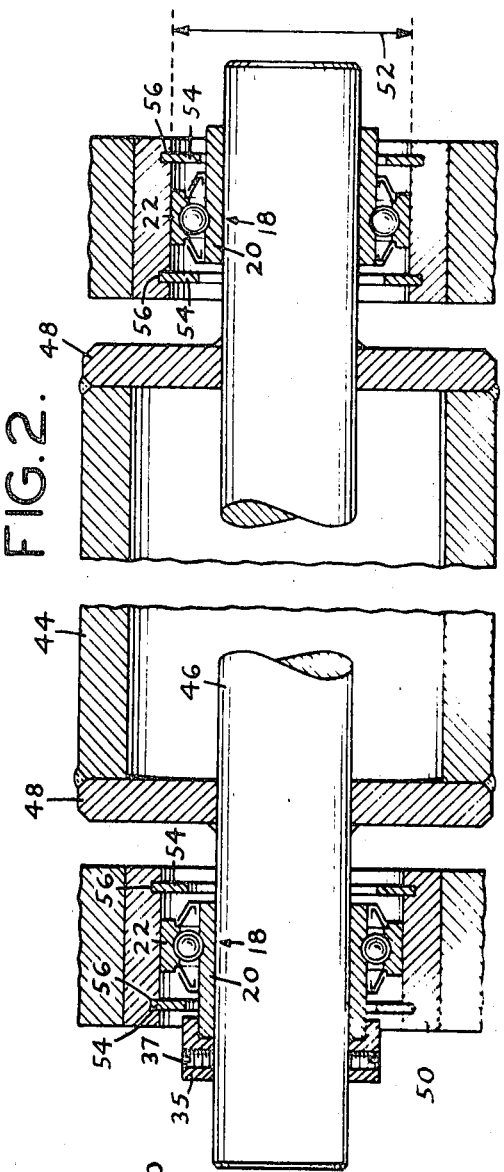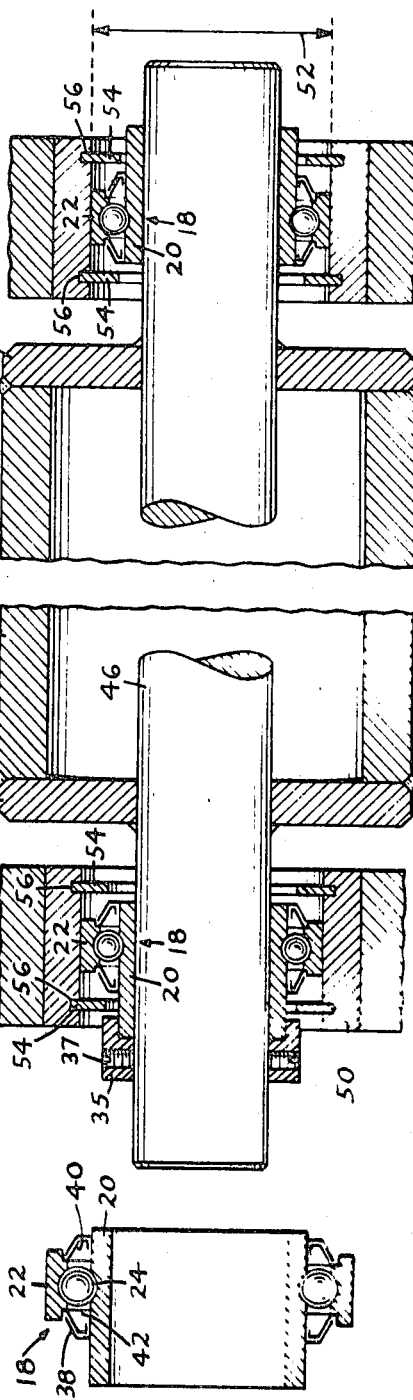
INVENTORS:
GEORGE N. CAHILL
FREDERICK D. STRINGER
GARY R. WHITCHER
BY
Jonathan Blount
ATTORNEY

TENDENCY IDLER ROLL AND IDLER ROLL

BACKGROUND OF THE INVENTION

This invention relates to tendency idler rolls and idler rolls which are used for conveying and supporting extruded plastic films from the extruding die through the various stages of the film curing process. More particularly the invention relates to improvements in the ball bearings and the ball bearing installations used in the tendency idler rolls and idler rolls, to facilitate improved rolling capability with a resultant improvement in the quality of the film produced.

DESCRIPTION OF THE PRIOR ART

The production of extruded plastic films includes methods whereby the extrusion is advanced at a predetermined rate through stages of the curing process by means of cylindrically shaped devices, referred to as rolls. In order to produce high quality films which are transparent, substantially haze free, properly oriented and uniform in thickness etc., it is necessary to subject the extruded films to certain accurately controlled conditions. Parameters which are critical to the quality of the film such as temperature, water vapor applications, film stress and the like must be monitored with substantial accuracy in order to produce a film product of desirable quality. A process which illustrates some of the conditions required is described, for example, in U.S. Pat. No. 3,387,068. Further disclosure of a process which illustrates the significance of these parameters is also made, for example, in U.S. Pat. No. 3,231,642.

The extruded film is generally heated or cooled during the process by internally controlling the temperature of the rolls. Thus the rolls may be heating rolls or cooling rolls as the particular film process may require. Where it may be desirable the relative rotational speeds of the rolls may be adjusted to facilitate the application of stresses to the extruded film. After the curing stages the film is ultimately rolled into its final packaged form.

At intermediate locations along the film or web path between the heating and cooling rolls it is necessary to provide additional support to the extruded film to prevent undesirable stresses due to sagging of the film from adversely affecting the quality of the final film product. This is usually facilitated through the use of an idler roll which is comprised of a tubular outer shell affixed to an inner shaft which is rotatably mounted to a fixed support. The idler roll outer shell is generally smaller in diameter than the heating or cooling rolls and the idler rolls are generally greater in quantity than the heating or cooling rolls in a typical film curing process. The film passes over and contacts the idler roll outer shell thereby rotating it as it passes thereover in the film curing process. Idler rolls are also utilized to change the direction of the web path where this may be desirable.

It is also helpful in certain instances to provide external driving means to rotate the idler rolls to assist in conveying the film in addition to supporting it. Where this is required modified idler rolls are provided which are driven at rotational speeds which approximate and assist the linear speed of the film as it passes thereover. Where the idler roll is driven it is generally referred to as a "tendency idler roll." Tendency idler rolls may also be used to change the direction of the film in addition to assisting it along its path.

In addition, to correct for discrepancies which may exist between the linear film speed and the rotational speed of the outer shell of the tendency idler roll, the outer shell is rotatably mounted to a driven inner shaft by means of a pair of outer shell ball bearings which are located at or near each internal end of the outer shell. Thus the film drag may increase or decrease the rotational speed of the outer shell to prevent slippage when a discrepancy exists between the linear film speed and the speed of the film contact surface of the outer shell.

In the idler rolls and the tendency idler rolls of the prior art the ball bearings which facilitated the rotational motion to the outer shells are affixed to their respective ball bearing seats by means of an interference fit between the outer race of the ball bearing and the ball bearing seat. By "interference fit" we refer to the means whereby an internal component as for example a bearing outer race, is affixed to an external component as for example the bearing seat. The diameter for example of the bearing seat is slightly less than the diameter of the bearing outer race and the bearing outer race is inserted within the bearing seat by the application of lateral pressure to the bearing to overcome the negative dimensional allowance. The magnitude of the negative dimensional allowance is generally determined by the particular use or operating conditions of the components.

The ball bearings of the prior art, in addition, are lubricated with a viscous ball bearing lubricant which remains viscous throughout the film curing process. The high degree of rolling freedom required in the idler rolls and tendency idler rolls used in film production is not only severely impaired by the difficulty encountered by the film in rotating the outer shells, as discussed in the preceding paragraphs, but also in overcoming the viscosity of the ball bearing lubricant. The seals of the prior art ball bearings which are used to prevent leakage of the ball bearing lubricant comprise a mechanical rub fit between the sealing elements and the ball bearing races. This results in a continuous friction producing factor which also must be overcome by the film extrusion as it passes over the roll. These factors cause film stresses which impair the quality of the final film product.

Accordingly, an object of the present invention is to improve the rolling capability of the idler rolls and tendency idler rolls by providing ball bearings which incorporate improved lubrication and lubricant sealing techniques whereby the rotational resistance of the device is minimized.

Another object of the present invention is to increase the rotational freedom of the idler rolls and tendency idler rolls by providing an improved bearing installation which substantially reduces the internal bearing rotational resistance which heretofore was caused by expansion of the surrounding materials under normal operating temperatures. Thus the improved bearing installation will substantially eliminate the rotational resistance heretofore encountered under normal operating conditions in the film production process.

SUMMARY OF THE INVENTION

It has now been found that the rotational resistance and binding of the bearings can be substantially reduced by providing improved ball bearings, and improved ball bearing lubricant and seals therefore, and an improved ball bearing installation and containment technique.

The ball bearing of the present invention is comprised of a circular outer race, a circular inner race, a radial space between the races and bearing balls in the space, which bearing balls facilitate the rotational motion of the bearings. The bearings are of the loose internal fit variety, i.e., there is a space between the balls and the outer race and the balls and the inner race rather than the normal preloaded condition of precision bearings. Attached to the inner periphery of the outer race and to the outer periphery of the inner race on each side of the space between the races are two intricately shaped circular sealing elements which are located within close proximity of each other but which are attached only to their respective races. Thus each sealing element continuously rotates with its respective race but in combination, they provide a torturous path or labyrinth through which a low viscosity lubricant cannot leak. The ball bearings incorporate a low viscosity lubricating oil which improves the rolling capability of the bearings. This ball bearing device is hereinafter referred to as a "labyrinth seal."

The ball bearings of the idler rolls and the tendency idler rolls of the present invention are installed in tubular shaped bearing seats which are drilled out to a slightly larger diameter than the external overall diameter of the bearing outer races. Thus the bearing fit is loose in order to facilitate greater rolling freedom to the ball bearing, especially under higher temperature operating conditions of the film production process.

DESCRIPTION OF THE DRAWINGS

The description refers to the accompanying drawings in which like reference characters refer to like parts throughout the several views and in which:

FIG. 1 is a sectional view of the driven tendency idler roll illustrating the use of the preferred ball bearings.

FIG. 2 is a sectional view of the undriven idler roll illustrating the use of the preferred ball bearings.

FIG. 3 is an enlarged sectional view of the preferred ball bearings illustrating the labyrinth oil seal.

DETAILED DESCRIPTION OF THE PREFERRED EMBODIMENT

Referring to FIG. 1, the preferred driven tendency idler roll 10 comprises a tubular outer shell 12 having ball bearing seats 14, fitted within the inner bore thereof and affixed to rotate therewith at or near each end by suitable means, as for example dowel pins 16. A ball bearing assembly 18 comprising a circular inner race 20, a circular outer race 22, a space between the races, and bearing balls 24 in the space, is fitted in each bearing seat 14 within a circular inner section defined by diameter 26. The diameter of the circular inner section of the bearing seat 14 is bored slightly larger than the external diameter of the outer race 22 of the bearing 18, to facilitate a loose fit for the bearing within the inner section 26 of the seat 14, thus providing sufficient leeway for the bearing outer race 22 under all operating temperatures. To prevent the loosely fitted bearings 18 from moving excessively in a lateral direction within the bearing seat 14, containment means are provided such as a lip 28, for example, at the inner end of the bearing seat 14 and a groove 30, for example, in the periphery of the circular inner section 26 of each bearing seat 14 into which groove a resilient snap ring 32, for example, is inserted after the bearing is installed.

Since the outer shell 12 is yieldably rotated in the tendency idler roll 10 by the friction in the outer shell bearings 18 when the inner shaft 34 is rotatably driven by external means 36 shown symbolically in FIG. 1, it is imperative that the inner race of at least one of the outer shell bearings 18 is affixed to rotate with the inner shaft 34 when it is rotated. This is facilitated for example by a circular locking collar 35 affixed to at least one bearing inner race 20 and fastened to rotate with the inner shaft 34 by means of a set screw 37.

The outer shell 12 is preferably constructed of a lightweight, corrosion resistant material, as for example, aluminum. The purpose of this is to minimize the inertial rotational resistance of the outer shell 12 and to preclude possible damage to the film due to surface corrosion when it contacts the surface of the outer shell 12. The inner shaft 34, which is preferably fabricated for example, of stainless steel, is rotatably mounted to a fixed support and rotated by suitable driving means 36.

Since the outer shell 12 and the inner shaft 34 are fabricated for example, of dissimilar materials the higher temperature extruded film may cause unequal axial thermal expansion in the inner shaft 34 and the outer shell 12. Thus the circular locking collar 35 is only provided on one of the bearings 18 and the inner shaft 34 is permitted to rotate freely and expand axially through the inner race 20 of the other bearing 18. It is recognized that thermal expansion and the like may, under certain conditions, cause the inner race 20 of the bearing 18, which bearing does not have the circular locking collar 35 attached thereto, to be affixed to rotate with the inner shaft 34. Also when the inner shaft 34 expands axially this bearing may shift laterally with the inner shaft 34 while it is expanding. To prevent the bearing outer race 22 from engaging the bearing containment means such as the bearing seat lip 28 or the snap rings 32 in the event of excessive unequal thermal expansion and the like of the outer shell 12 and the inner shaft 34, adequate lateral leeway should be provided for the bearings within the bearing seat inner sections 26.

In an alternate embodiment a circular locking collar 35 may be provided at each bearing 18 to cause the inner race 20 to rotate with the inner shaft 34, however it is then imperative that adequate lateral leeway is provided for the bearings 18 in the bearing seats 14 to facilitate adequate free lateral movement of the bearings within the seats when the outer shell 12 undergoes thermal expansion which is unequal to the thermal expansion of the inner shaft 34.

When the surface of the film contacts the external surface of the outer shell 12 as it pass thereover, the rotary motion of the outer shell supplements the linear motion of the film and assists its forward movement through the stages of the fim curing process. However, when for operational reasons, the rotational speed of the outer shell 12 is greater than, or less than the specific rotational speed required to assist the linear film speed, the discrepancy is adjusted by the independent rotational mounting of the outer shell 12 on the inner shaft 34 by the bearings 18. The friction coefficient, or drag between the surface of the film and the surface of the outer shell 12 must be sufficient to enable the film to reduce or increase the rotational speed of the outer shell 12 when a discrepancy actually does exist.

Since the surface of certain films as, for example, nylon (polyamide) resin films, have substantially low friction coefficients the outer shell 12 must have a high degree of rotational freedom to facilitate adjustment of the outer shell rotational speed to match the linear film speed. In the absence of suitable outer shell rotational freedom, as for example when the ball bearings malfunction or become bound due to excessive friction therein the film will slide over the outer shell and become subjected to undesirable stresses due to its inability to adjust the rotational speed of the outer shell. This is true notwithstanding the fact that the externally provided rotational motion is actually transmitted from the inner shaft 34 to the outer shell 12 by bearing friction. When the outer shell bearings 18 are loosely fitted within the bearing seats 14, in contrast to the interference fit of the prior art, binding of the ball bearings 18 as was evident in configurations of the prior art does not occur. Further, there is no evidence of any radial pressure on the bearing balls 24 surrounding the bearings as was evident in the interference fitted bearings of prior art configuration.

To further improve the rotational freedom of the outer shell 12, the present invention utilizes an improved circular ball bearing assembly 18 which incorporates a low viscosity lubricating oil and an improved sealing technique to retain the oil. The bearings of the prior art, which are lubricated by a relatively viscous ball bearing grease, are sealed against leakage thereof by mechanical, or rub fit seals. The high viscosity of the lubricating grease and the continuous friction of the mechanical seals rubbing against the bearing races actually contributed to the rotational resistance of the tendency idler roll, which resistance rendered the film unable to adjust the rotational speed of the outer shell 12 in order to match or assist the linear film speed. These factors thus contribute to the lack of rotational freedom which is evident in the tendency idler rolls of the prior art.

The circular ball bearings 18 of the present invention which are illustrated in FIG. 3, have an outer race 22, an inner race 20, a space between the races, and bearing balls 24 in the space. The bearing balls 24 are lubricated by filling the space 42 surrounding the bearing balls with a low viscosity lubricating oil and sealing the bearing against leakage by means of a labyrinth seal on each side of the ball bearing. The labyrinth seal comprises two circular sealing elements 38 and 40 on each side of the balls, which elements have complimentary irregularly shaped profiles as viewed along the edges thereof. On each side of the bearing balls each element is affixed to its respective bearing race and each is located within close proximity of the other to create a torturous path or labyrinth between the elements, through which path the low viscosity lubricating oil cannot leak. Each element of the labyrinth seal rotates with the bearing race to which it is connected, but no rubbing or contact takes place between the respective sealing elements or between the sealing elements and the bearing races. This improved bearing sealing technique, in combination with the improved low viscosity lubricating oil, has proven to substantially increase the rotational freedom of the outer shell 12 with respect to the inner shaft 34. These improvements, together with the improved bearing installation technique heretofore described have improved the rotational freedom of the outer shell 12 with respect to the inner shaft 34 to eliminate the slippage which had heretofore existed between films having low surface coefficients of friction and the tendency idler rolls of the prior art. They have substantially eliminated the undesirable film stresses and improved the general quality of the film produced.

Undriven idler rolls are used in the film production process to change the direction of the film or web path or to support the film to prevent sagging at intermediate locations between the heating and cooling rolls. This additional support is required to prevent undesirable film stresses which are caused by sagging of the film. The idler roll, which is illustrated in FIG. 2, is constructed similarly to the tendency idler roll heretofore described, except that the outer shell 44 is affixed to the inner shaft 46 by circular end plates 48 which may be welded to the outer shell at each end thereof and welded to the inner shaft, for example. The inner shaft 46 is rotatably mounted to a fixed support by means of the improved labyrinth sealed circular ball bearings 18 of the instant invention heretofore described. The improved labyrinth sealing technique permits the use of a low viscosity oil in the ball bearings 18 as heretofore described in the description of the tendency idler rolls. The inner race 20 of at least one of the ball bearings 18 may be affixed to the inner shaft 46 by suitable means to rotate therewith and to prevent the inner shaft 46 from shifting excessively in an axial direction within the inner races 20 of the bearings 18. For example, a circular locking collar 35 may be affixed to rotate with the inner race 20 of at least one ball bearing 18 and fastened to the inner shaft 46 by means of a set screw 37. It is recognized that thermal expansion and the like may, under certain conditions, cause the inner race 20 of the bearing 18, which bearing does not have the circular locking collar 35 attached thereto, to be affixed to rotate with the inner shaft 46. Also when the inner shaft 46 expands axially this bearing may shift laterally with the inner shaft 46 while it is expanding. To prevent the bearing 18 from engaging the bearing containment means in the seat 50 adequate lateral leeway should be provided in the bearing seat 50 to permit the bearing to move laterally therein.

In an alternate embodiment a circular locking collar 35 may be provided at each bearing 18 to cause the inner race 20 to rotate with the inner shaft 46, however, it is then imperative that adequate lateral leeway is provided for the bearings 18 in the bearing seats 50 to facilitate adequate free lateral movement of the bearings 18 within the seats 50 when the outer shell 12 undergoes thermal expansion which differs from the thermal expansion of the inner shaft 46.

The ball bearing 18 is loosely fitted within each bearing seat 50 by providing sufficient radial leeway between the circular inner section defined by dimension 52 of the bearing seat 50 and the bearing outer race 22. The loosely fitted ball bearings are provided with suitable means for lateral containment to prevent them from moving excessively in a lateral direction within the bearing seats 50. For example, resilient snap rings 54 may be provided in grooves 56 in the periphery of the circular inner section 52 of the bearing seat 50 on each side adjacent to the ball bearing 18. The loosely fitted ball bearings provide a unique improvement over the interference fitted ball bearings of the prior art.

The improved idler rolls of the instant invention utilize the improved labyrinth sealed ball bearing heretofore described with reference to the tendency idler rolls. The improved bearings are lubricated with a low viscosity lubricating oil to improve the rolling capability of the bearings over the bearings of the prior art.

Thus the improved ball bearings which are loosely fitted within their bearing seats in the idler rolls, provide a substantial improvement over the idler rolls of the prior art. The improved rolling capability permits the heated extruded film to continuously rotate the improved idler rolls despite a low friction coefficient on the surface of the film. This improved rolling capability significantly reduces the film stresses heretofore caused by binding of the idler rolls of the prior art.

These improvements contribute substantially to the ultimate quality of the film product by reducing the stresses and slippage which occurred in the film. The surface damage which was caused by the rubbing between the extruded film and the frequently bound tendency idler rolls and the idler rolls of the prior art is substantially reduced.

In a specific use of the present invention a tendency idler roll of the prior art was fitted with the improved labyrinth sealed circular ball bearings of the instant invention. The diameter of the circular inner bearing accepting sections of the bearing seats were increased to provide sufficient leeway to the outer race of the bearing as heretofore discussed and the inner race of one of the ball bearings was affixed to rotate with the inner shaft. The inner end of the inner section of each bearing seat was provided with a lip on the inner side of the seat to provide internal containment for the loosely fitted bearings. To provide external containment for the bearings, grooves were provided in the periphery of the bearing seat inner section on the external side of the bearings into which grooves resilient retaining snap rings were inserted. Sufficient leeway was provided between the lip and the snap ring to permit lateral movement of the bearings when the inner shaft expands due to the temperature changes caused by the higher temperature film extrusion, in the event the ball bearing inner race which is not affixed to rotate with the inner shaft shifts when the inner shaft expands. The lateral leeway thus prevents engagement of the ball bearing with the snap rings or the bearing seat lips.

The tendency idler roll was installed for use in a nylon (polyamide) resin film production process and the inner shaft was rotatably driven. The extruded film which passed over the surface of the tendency idler roll was assisted in its forward motion by the rotational motion of the outer shell transmitted through the outer shell bearings from the driven inner shaft of the tendency idler roll. When the film speed differed from the rotational speed of the yieldably rotated outer shell the drag between the outer shell and the polyamide film was sufficient to adjust the rotational speed of the outer shell to match it to the linear film speed as the film passed thereover. The film stresses, which had heretofore been caused by slippage between the film and the surface of the outer shell, were substantially eliminated.

In a specific use of the instant invention as applied to the undriven idler rolls the improved ball bearings were installed in an idler roll providing sufficient radial leeway to the ball bearing outer races in the ball bearing seats. The inner race of one of the ball bearings was affixed to rotate with the inner shaft. THe bearings were suitably contained by providing resilient snap rings in grooves provided therefor in the periphery of the inner section of the bearing seat on each side of the ball bearing. Sufficient lateral leeway was provided between the snap rings to permit lateral movement of the bearings in the bearing seats when the inner shaft expands due to the heat of the extruded film in the event the ball bearing inner race which is not affixed to rotate with the inner shaft shifts when the inner shaft expands. The lateral leeway thus prevents engagement of the ball bearings with the snap rings or bearing seat lips.

The idler roll was rotatably installed on a fixed support provided therefor for use in a nylon (polyamide) resin film production process. The bearing seats were affixed to the fixed support. The extruded film was passed over the surface of the idler roll while undergoing a curing process. The idler roll continuously rotated freely as the film passed thereover and no binding was evident in the rotational motion of the idler roll.

Although I have disclosed but one preferred embodiment of the present invention, it will be obvious to one skilled in the art that many changes and modifications may be made therein without departing from the spirit of the invention.

What is claimed is:

1. In a tendency idler roll for conveying and supporting extruded films, the tendency idler roll comprising a tubular aluminum outer shell having an internal bore therethrough, a longer round stainless steel inner shaft having a diameter less than the outer shell internal bore, the shaft extending through the center of the outer shell, means to rotate the inner shaft, and means to transmit the rotation of said shaft to said outer shell, the improvement which comprises:

A. a circular ball bearing assembly at each end of the outer shell bore rotatably mounting the outer shell on the inner shaft, said bearing assembly having a circular inner race and a circular outer race having a radial space therebetween, the inner race of at least one ball bearing assembly being affixed to the inner shaft to rotate therewith, bearing balls in the space, labyrinth lubricant sealing elements affixed to the races, and a low viscosity lubricating oil in the space between the races to lubricate the bearing balls;

B. a bearing seat within each end of the outer shell bore to accept each bearing, said seats having a circular inner section having a diameter slightly larger than the outer race diameter of said circular bearings to accept each bearing within the circular inner section and to facilitate a loose fit for said bearings in said seats;

C. a lip on the inner side of each bearing seat circular inner section, said lip having an inside diameter less than the outer race diameter of said bearing, said lip thereby reducing the inner section diameter to less than the outer race diameter of said bearing at the inner side of each bearing to prevent said bearings from sliding out of the inner side of said bearing seats;

D. a groove in the periphery of the circular inner section of each bearing seat on the outer side of said bearings; and E. a resilient snap ring inserted into each groove, said snap ring having an inside diameter less than the outer race diameter of said bearing to facilitate lateral containment of said bearings on the outer side thereof within said bearing seats.

2. In a device for supporting films, the device having a rotatable tubular outer shell which rotates as the supported film passes thereover and makes contact therewith, a rotatable inner shaft extending through the center of the outer shell and means to transmit the rotation of said shaft to said outer shell, the improvement which comprises:

A. a circular ball bearing assembly at each end of the device to rotatably mount the outer shell, said bearing assembly having a circular inner race and a circular outer race having a radial space therebetween, bearing balls in the space, labyrinth lubricant sealing elements affixed to the races, and a low viscosity lubricating oil in the space between the races to lubricate the bearing balls, at least one bearing inner race being affixed to the inner shaft to rotate therewith;

B. a bearing seat at each end of the device to accept each bearing, said seats having a circular inner section having a diameter slightly larger than the outer race diameter of said circular bearings to accept each bearing within the circular inner section and to facilitate a loose fit for said bearings in said seats; and C. means to contain said loosely fitted bearings laterally within each bearing seat.

3. In a tendency idler roll for conveying and supporting films, the tendency idler roll comprising a tubular outer shell having an internal bore therethrough, a longer round inner shaft having a diameter less than the outer shell bore, the shaft extending through the center of the outer shell, means to rotate the inner shaft, and means to transmit the rotation of said shaft to said outer shell, the improvement which comprises:

A. a circular bearing assembly at each end of the outer shell within the internal bore thereof rotatably mounting the outer shell on the inner shaft, said circular bearing assembly comprising a ball bearing assembly having a circular inner race and a circular outer race having a radial space therebetween, the inner race of at least one ball bearing assembly being affixed to the inner shaft to rotate therewith, bearing balls in the space, labyrinth lubricant sealing elements affixed to said races, and a low viscosity lubricating oil in the space between the races to lubricate the bearing balls;

B. a bearing seat within each end of the outer shell bore to accept each bearing, said seats having a circular inner section having a diameter slightly larger than the outer race diameter of said circular bearings to accept each bearing within the circular inner section and to facilitate a loose fit for said bearings in said seats; and C. means to contain said loosely fitted bearings laterally within each bearing seat.

4. The improved tendency idler roll as described in claim 3 wherein the means to contain said loosely fitted bearings laterally within the inner sections of said bearing seats comprises:

A. a lip on the inner side of each bearing seat circular inner section, said lip having an inside diameter less than the outer race diameter of said bearing, said lip thereby reducing the inner section diameter to less than the outer race diameter of said bearing at the inner side thereof to prevent said bearings from sliding out of the inner side of said bearing seats;

B. a groove in the periphery of the circular inner section of each bearing seat on the outer side of said bearing; and C. a resilient snap ring inserted into each groove, said snap ring having an inside diameter less than the outer race diameter of said bearing to prevent said bearings from sliding out of said bearing seats on the outer side thereof.

* * * * *